United States Patent
Do et al.

(10) Patent No.: US 8,621,399 B2
(45) Date of Patent: Dec. 31, 2013

(54) METHODS OF DESIGNING SEMICONDUCTOR DEVICES AND METHODS OF MODIFYING LAYOUTS OF SEMICONDUCTOR DEVICES

(75) Inventors: Kyung-Tae Do, Mansan-si (KR);
Yong-Seok Lee, Suwon-si (KR);
Hyo-Sig Won, Suwon-si (KR);
Jung-Yun Choi, Hwaseong-si (KR);
Jong-Ho Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 13/458,516

(22) Filed: Apr. 27, 2012

(65) Prior Publication Data
US 2012/0297349 A1    Nov. 22, 2012

(30) Foreign Application Priority Data
May 17, 2011    (KR) .......................... 10-2011-0046094

(51) Int. Cl.
G06F 17/50    (2006.01)

(52) U.S. Cl.
USPC .............................................. 716/52; 716/53

(58) Field of Classification Search
USPC ................................................ 716/51, 52, 53
See application file for complete search history.

(56) References Cited

U.S. PATENT DOCUMENTS 7,499,582 B2    3/2009    Kotani et al.
2005/0223350 A1*    10/2005    Zhang et al. .................... 716/21

FOREIGN PATENT DOCUMENTS

| JP | 2002-246474 A | 8/2002 |
| JP | 2005-026360 A | 1/2005 |
| JP | 2009-026045 A | 2/2009 |

* cited by examiner

*Primary Examiner* — Vuthe Siek
(74) *Attorney, Agent, or Firm* — Harness, Dickey & Pierce, P.L.C.

(57) ABSTRACT

In a method of designing a semiconductor device, a transistor included in a layout of the semiconductor device may be selected. A biasing data may be set for changing a characteristic of the selected transistor. A design rule check (DRC) process for the layout of the semiconductor device may be performed after ignoring the biasing data. An optical proximity correction (OPC) process for the layout of the semiconductor device may be performed based on the biasing data.

20 Claims, 11 Drawing Sheets

METHODS OF DESIGNING SEMICONDUCTOR DEVICES AND METHODS OF MODIFYING LAYOUTS OF SEMICONDUCTOR DEVICES

CROSS-REFERENCE TO RELATED APPLICATION

This application claims priority under 35 USC §119 to Korean Patent Application No. 10-2011-0046094, filed on May 17, 2011 in the Korean Intellectual Property Office (KIPO), the contents of which are herein incorporated by reference in its entirety.

BACKGROUND

1. Technical Field

Example embodiments relate to a semiconductor device and/or a method of designing a semiconductor device.

2. Description of the Related Art

In a manufacturing process of a semiconductor device, a plurality of circuit patterns are formed on a wafer by performing a photolithography process using a plurality of masks. A layout of the semiconductor device (e.g., the circuit patterns) needs to be designed prior to the manufacturing process of the semiconductor device. The layout of the semiconductor devices is designed by performing a design rule check (DRC) process and an optical proximity correction (OPC) process. To change a characteristic of the semiconductor device, the layout of the semiconductor device may be modified during the layout designing or after the layout design is finished. A design rule violation may occur due to the modification of the layout of the semiconductor device.

SUMMARY

Various example embodiments relate to methods of designing a semiconductor device. The methods may be capable of effectively modifying a layout of the semiconductor device without a design rule violation.

In a method of designing a semiconductor device according to various example embodiments, a transistor included in a layout of the semiconductor device may be selected. A biasing data may be set or assigned for changing a characteristic of the selected transistor. A design rule check (DRC) process for the layout of the semiconductor device may be performed or conducted while ignoring the biasing data. An optical proximity correction (OPC) process for the layout of the semiconductor device may be performed based on the biasing data.

In an example embodiment, the biasing data may be set by changing data type of a target polygon pattern included in the selected transistor. The target polygon pattern may correspond to one of various components in the selected transistor.

The DRC process may be performed by performing the DRC process for the layout of the semiconductor device based on a first data type of the target polygon pattern. The first data type may correspond to a pre-changed data type before the data type of the target polygon pattern is changed.

The OPC process may be performed by performing the OPC process for the layout of the semiconductor device based on a second data type of the target polygon pattern. The second data type may correspond to the changed data type after the data type of the target polygon pattern is changed.

In the method of designing the semiconductor device, a second DRC process for the layout of the semiconductor device may be further performed based on the second data type of the target polygon pattern.

A gate length of the selected transistor may be modified based on the changed data type of the target polygon pattern. A width of the selected transistor may be modified based on the changed data type of the target polygon pattern.

The biasing data may correspond to a value that is within design margins and/or manufacturing process margins for the semiconductor device.

In another example embodiment, the biasing data may be set by adding a first polygon pattern associated with a target polygon pattern. The target polygon pattern may correspond to one of various components in the selected transistor.

The biasing data may be set by further setting a data type of the first polygon pattern.

The DRC process may be performed by performing a first DRC process for the layout of the semiconductor device based on the target polygon pattern.

The DRC process may be performed by further performing a second DRC process for the layout of the semiconductor device based on the first polygon pattern.

The second DRC process may be a process for checking the data type of the first polygon pattern and a layer data of the first polygon pattern.

The OPC process may be performed by generating a second polygon pattern by merging the target polygon pattern and the first polygon pattern, and by performing the OPC process for the layout of the semiconductor device based on the second polygon pattern.

A gate length of the selected transistor and/or a width of the selected transistor may be modified based on the first polygon pattern.

Accordingly, in a method of designing a semiconductor device according to various example embodiments, when a designer modifies the target polygon pattern in the layout of the semiconductor device by using design margins and/or manufacturing process margins, the DRC process may be performed after ignoring the biasing data that is used for modifying the layout of the semiconductor device (e.g., changing the characteristic of the transistor). Thus, a designer may effectively modify the layout of the semiconductor device without a design rule violation. As a result, a designer may more rapidly and accurately design the layout of the semiconductor device.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
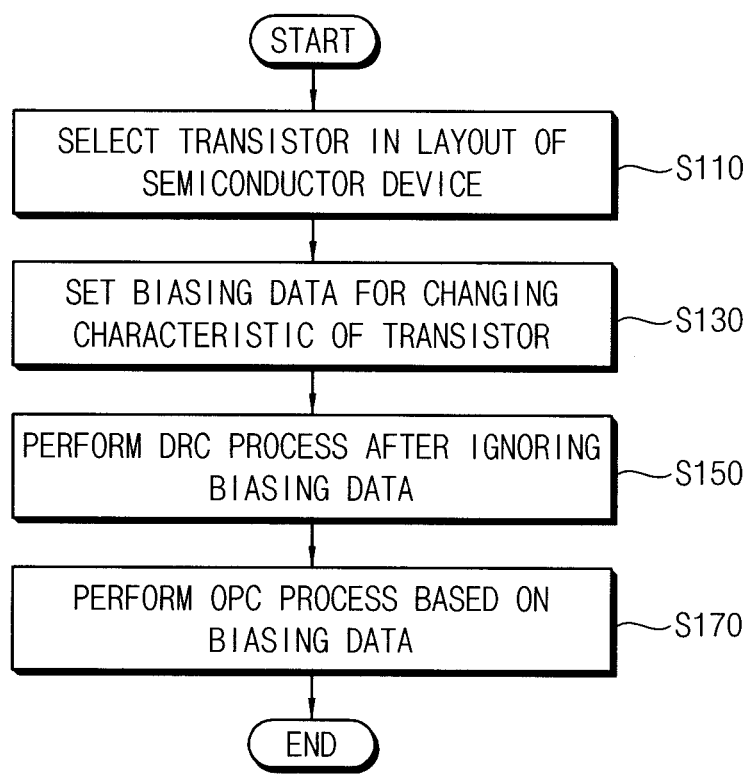
FIG. 1 is a flow chart illustrating a method of designing a semiconductor device according to some example embodiments.

Various example embodiments will be described more fully herein with reference to the accompanying drawings. This inventive concept may, however, be embodied in many different forms and should not be construed as limited to the embodiments set forth herein. Rather, these embodiments have been provided so that this disclosure will be more thorough and complete so as to fully convey the scope of the inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flow chart illustrating a method of designing a semiconductor device according to some example embodiments.

Referring to FIG. 1, a transistor included in a layout of the semiconductor device is selected (step S110), a biasing data for changing a characteristic of the selected transistor is set (step S130), a design rule check (DRC) process for the layout of the semiconductor device is performed after ignoring the biasing data (step S150), and an optical proximity correction (OPC) process for the layout of the semiconductor device is performed based on the biasing data (step S170). In the method of designing the semiconductor device according to some example embodiments, the biasing data, which is used to modify the layout of the semiconductor device, is excluded during the DRC process, thereby preventing a design rule violation due to a biasing (e.g., a modification) of the layout of the semiconductor device.

As used herein, the term "biasing" may represent that a shape of a semiconductor element (e.g., a transistor) in a semiconductor device is modified to change a characteristic of the semiconductor element. The semiconductor element may be included in the layout of the semiconductor device. The term "biasing data" may represent a data that is used for modifying a shape of a polygon pattern included in the semiconductor element and for changing the characteristic of the semiconductor element. The term "polygon pattern" may represent one of various components, which has a predetermined shape and is included in the semiconductor element. For example, as described below with reference to FIG. 2, a transistor may include polysilicon polygon patterns corresponding to polysilicon regions, active polygon patterns corresponding to active regions, and N-well polygon patterns corresponding to N-well regions. When the semiconductor device is designed by a computer program (e.g., a Computer Aided Design (CAD)) that is executed on a computing system, each polygon pattern may be an object for the computer program and may include information such as a shape of the polygon pattern, a position of the polygon pattern, data type of the polygon pattern, layer including the polygon pattern, etc. The DRC process may be performed based on such information included in each polygon pattern.

In an example embodiment, as described below with reference to FIGS. 4 and 13, the biasing data may be set by changing the data type of a target polygon pattern included in the selected transistor. The target polygon pattern may indicate at least one polygon pattern, a shape of which needs to be modified. In this embodiment, the DRC process may be performed based on a pre-changed data type of the target polygon pattern after ignoring the changed data type of the target polygon pattern. In another example embodiment, as described below with reference to FIG. 14, the biasing data may be set by adding an additional polygon pattern associated with the target polygon pattern. In this embodiment, the DRC process may be performed based on the original target polygon pattern after ignoring the additional polygon pattern.

To form a plurality of circuit patterns of the semiconductor device on a wafer, a layout of the semiconductor device (e.g., a layout of the circuit patterns) may be designed and at least one photomask may be manufactured. The at least one photomask may include a plurality of mask patterns (e.g., light shielding patterns, phase shifting patterns, etc.) corresponding to the layout of the circuit patterns. The circuit patterns may be formed on the wafer by performing a photolithography and lithography process using the photomasks.

The layout of the semiconductor device may include a plurality of polygon patterns that have various shapes and sizes. Each polygon pattern may correspond to a circuit element such as a gate, an isolation layer, a doped region, a capacitor, a bitline, a metal line, a contact plug, etc. The layout of the semiconductor device may be designed by performing a placement and routing (P&R) process, e.g., by placing the polygon patterns on desired positions and by routing the polygon patterns. When the layout of the semiconductor device is designed by a computer program (e.g., a programming tool, simulation tool, etc.), the P&R process may also be performed by the computer program.

To determine whether the designed layout of the semiconductor device complies with a design rule, a DRC process may be performed. The design rule may be referred to as a critical dimension (CD) that indicates a minimum guarantee width of a metal line, a minimum guarantee distance between two contiguous metal lines, and/or a minimum overlap between two contiguous regions. The size and the integration degree of the semiconductor device may be determined based on the design rule.

When the layout of the semiconductor device is designed by the computer program, the DRC process may also be performed by the computer program (e.g., a programmed design rule deck). The DRC process may be performed by detecting a design failure (e.g., a hot spot region) in the layout of the semiconductor device using a predetermined design rule duty such as the minimum guarantee width, the minimum guarantee distance, the minimum overlap, etc. The predetermined design rule duty may be stored in the computer program, as a design rule table or a design rule file. For example, the design failure may be detected by checking whether a width of a polygon pattern corresponding to a metal line is smaller than the minimum guarantee width. A reliability of the designed layout of the semiconductor device may be ensured by performing the DRC process.

As an integrated circuit becomes more highly integrated, the design rule may decrease. In the photolithography process, the optical proximity effect (OPE) between neighboring patterns may cause defects. For example, a corner rounding phenomenon in which corners of a quadrilateral pattern are rounded by diffraction of light, and/or a phenomenon in which sparsely collected patterns in a region (e.g. an isolated region) are patterned to have a small size compared to patterns in a densely collected region, may be caused. Thus, the OPC process has been performed to minimize distortion of light and to correct diffraction of light using a pattern, thereby preventing the defects of the semiconductor device.

To improve a performance of the semiconductor device, a designer may change a characteristic of the semiconductor element, e.g., a transistor and/or a metal line. The characteristic of the transistor may be changed by modifying a width or a gate length of the transistor. The designer may modify the target polygon pattern in the layout of the semiconductor device to change the characteristic of the transistor. In an initial design process, the target polygon pattern may be easily modified. When the target polygon pattern needs to be modified for an optimization of the semiconductor device after the DRC process is finished, or when a standard cell library is used for designing the layout of the semiconductor device, a design rule violation may occur due to such modification of the target polygon pattern. However, some design rule violation may be negligible in the manufacturing process because of design margins and/or manufacturing process margins for the semiconductor device. For example, the designer may modify the width or the gate length of the transistor within a manufacturing process margin in which a distance between a contact and a polysilicon region in the transistor is set to have a margin of about 10%, or within a design margin in which a region assigned to a predetermined polygon pattern in the standard cell library is not used in a design process.

In a conventional method of designing a semiconductor device, when a designer modifies a target polygon pattern in a layout of the semiconductor device by using such design margins and/or manufacturing process margins, a plurality of design rule violations occur due to such modification of the target polygon pattern. The plurality of design rule violations include light design rule violations that are negligible in a manufacturing process and heavy design rule violations that are not negligible in the manufacturing process. The light design rule violations may cause a degradation of design efficiency. In addition, if the designer misses the heavy design rule violations due to the plurality of light design rule violations, a reliability of the designed layout of the semiconductor device may not be ensured.

In the method of designing the semiconductor device according to some example embodiments, when the designer modifies the target polygon pattern in the layout of the semiconductor device by using such design margins and/or manufacturing process margins, the DRC process is performed after ignoring the biasing data that is used for modifying the layout of the semiconductor device (e.g., changing the characteristic of the transistor). The designer may effectively modify the layout of the semiconductor device without the design rule violation (e.g., the light design rule violation). In addition, the OPC process is performed based on the biasing data. As a result, the designer may more rapidly and accurately design the layout of the semiconductor device.

Figure 2:
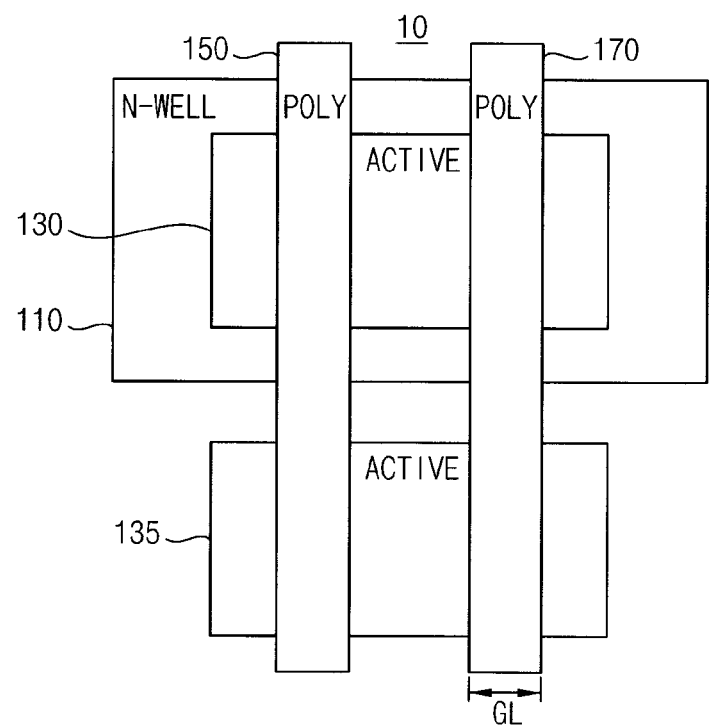
FIGS. 2 and 3 are diagrams for describing polygon patterns used with the method of FIG. 1.
Figure 3:
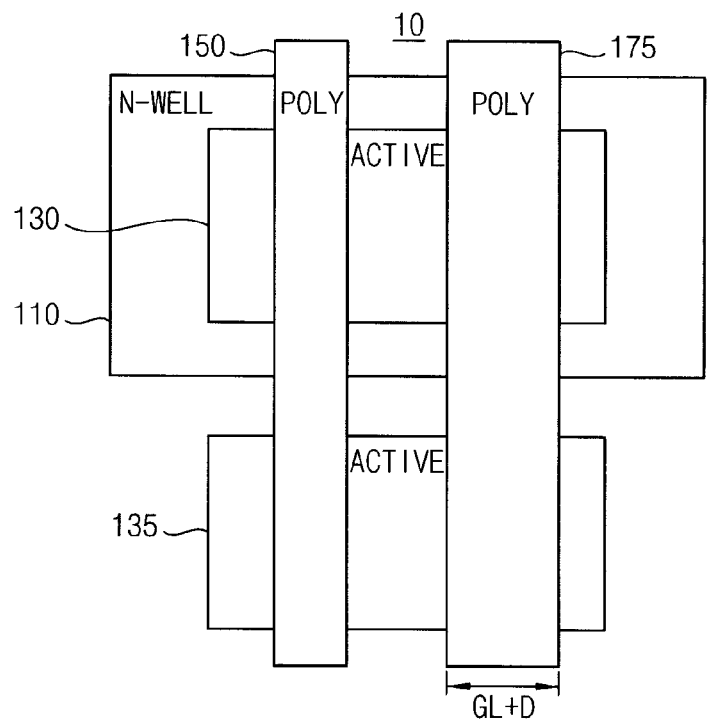

FIGS. 2 and 3 are diagrams for describing polygon patterns used with the method of FIG. 1.

Referring to FIGS. 2 and 3, a semiconductor element 10 may be formed in the layout of the semiconductor device, and may include at least one of various transistors. The semiconductor element 10 may include a N-well region 110, active regions 130 and 135, and polysilicon regions 150 and 170 forming gate electrodes of the transistors. In the design process, each region may correspond to a polygon pattern that has a predetermined shape in the computer program. For example, the N-well region 110 may correspond to a N-well polygon pattern, the active regions 130 and 135 may correspond to active polygon patterns, and the polysilicon regions 150 and 170 may correspond to polysilicon polygon patterns.

The layout of the semiconductor device may include a plurality of layers. Each polygon pattern may be included in a respective one of the layers. If a first polygon pattern has a property that is substantially the same as a property of a second polygon pattern, the first and second polygon patterns may be included in a single layer. For example, the active polygon patterns corresponding to the active regions 130 and 135 may be included in a first layer of the plurality of layers. The polysilicon polygon patterns corresponding to the polysilicon regions 150 and 170 may be included in a second layer of the plurality of layers. As described below with reference to FIGS. 5 through 12, information for the layer including the polygon pattern may be set to have a layer data (e.g., a layer number) in the computer program. If the first polygon pattern has a layer number that is substantially the same as a layer number of the second polygon pattern, the first and second polygon patterns may be formed by using a single photomask in the manufacturing process.

As illustrated in FIGS. 2 and 3, the polysilicon polygon pattern corresponding to the polysilicon region 170 may need to be modified for optimization in the design process. For example, a gate length GL corresponding to the polysilicon region 170 may need to be increased by a dimension D. In other words, the polysilicon polygon pattern corresponding to the polysilicon region 170 may be the target polygon pattern. In the conventional method of design the semiconductor device, the polysilicon polygon pattern corresponding to the polysilicon region 170 is selected as the target polygon pattern, and the target polygon pattern is directly modified by increasing a length of the target polygon pattern by D in the layout of the semiconductor device. The polysilicon polygon pattern that corresponds to the polysilicon region 170 and has a length of about GL is directly changed into the polysilicon polygon pattern that corresponds to a modified polysilicon region 175 and has a length of about (GL+D). In a conventional method, a design rule violation (e.g., the light design rule violation) may occur due to such increasing of the gate length. However, when the designer modifies the gate length within a margin (e.g., the manufacturing process margin and/or the design margin), such design rule violation may be negligible.

Figure 4:
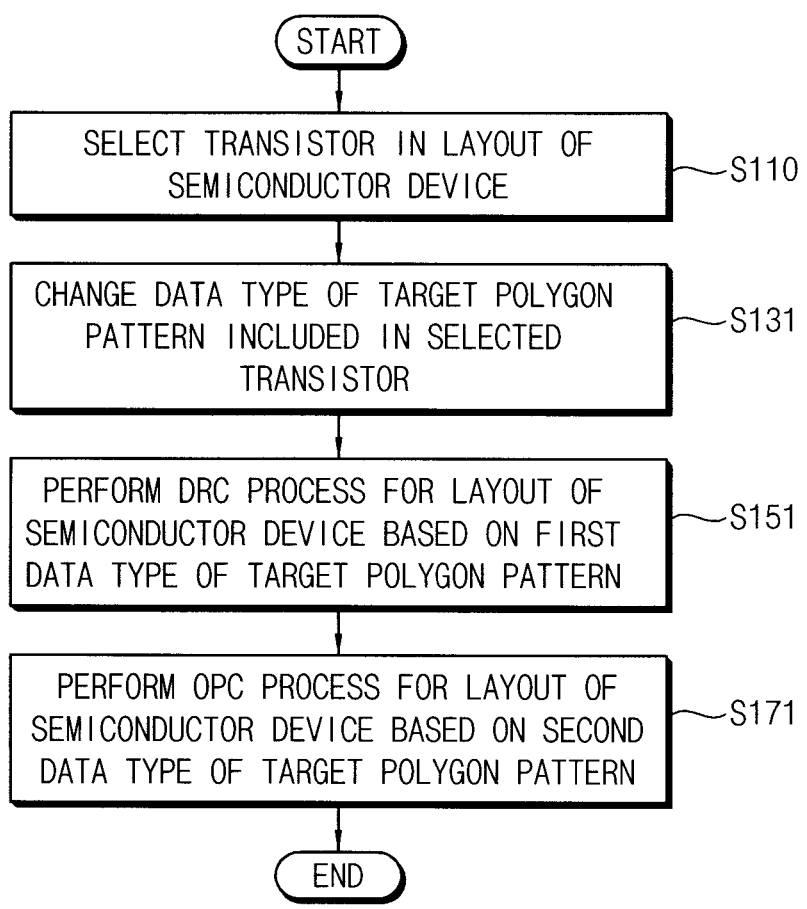
FIG. 4 is a flow chart illustrating an example of the method of FIG. 1.

FIG. 4 is a flow chart illustrating an example of the method of FIG. 1.

Referring to FIG. 4, in the method of designing the semiconductor device according to an example embodiment, the transistor included in the layout of the semiconductor device may be selected (step S110), the data type of the target polygon pattern included in the selected transistor may be changed (step S131), the DRC process for the layout of the semiconductor device may be performed based on a first data type of the target polygon pattern (step S151), and the OPC process for the layout of the semiconductor device may be performed based on a second data type of the target polygon pattern (step S171). The target polygon pattern may correspond to one of various components in the selected transistor and may need to be modified. The first data type may correspond to a pre-changed data type before the data type of the target polygon pattern is changed. The second data type may correspond to the changed data type after the data type of the target polygon pattern is changed.

The step S110 may be substantially the same as the step S110 in FIG. 1. The step S131 may correspond to the step S130 in FIG. 1. Typically, in the computer program, the polygon pattern may include information such as data type, a layer data (e.g., a layer number), etc. The data type may represent a characteristic (e.g., a drawing, a text, etc.) of the polygon pattern. The layer number may represent a layer including the polygon pattern and may be mapped to a mask used in the manufacturing process. In this embodiment, the biasing data may be set by changing the data type of the target polygon pattern. The layout of the semiconductor device may be modified based on the changed data type of the target polygon pattern in the OPC process.

In an example embodiment, the biasing data may correspond to a value that is within the design margins and/or the manufacturing process margins for the semiconductor device.

The steps S151 and S171 may correspond to the steps S150 and S170 in FIG. 1, respectively. In other words, the DRC process may be performed after ignoring the changed data type, and the OPC process may be performed based on the changed data type. In the DRC process, since a shape of the target polygon pattern is not directly modified, a design rule violation (e.g., a light design rule violation) may be prevented by ignoring the changed data type. Thus, the layout of the semiconductor device may be effectively modified without the design rule violation.

In an example embodiment, as described below with reference to FIG. 13, a second DRC process for the layout of the semiconductor device may be further performed based on the second data type of the target polygon pattern.

FIGS. 5, 6, 7 and 8 are diagrams for describing the method of FIG. 4. In FIGS. 5, 6, 7 and 8, a gate length of the selected transistor may be modified based on the changed data type of the target polygon pattern.

Figure 5:
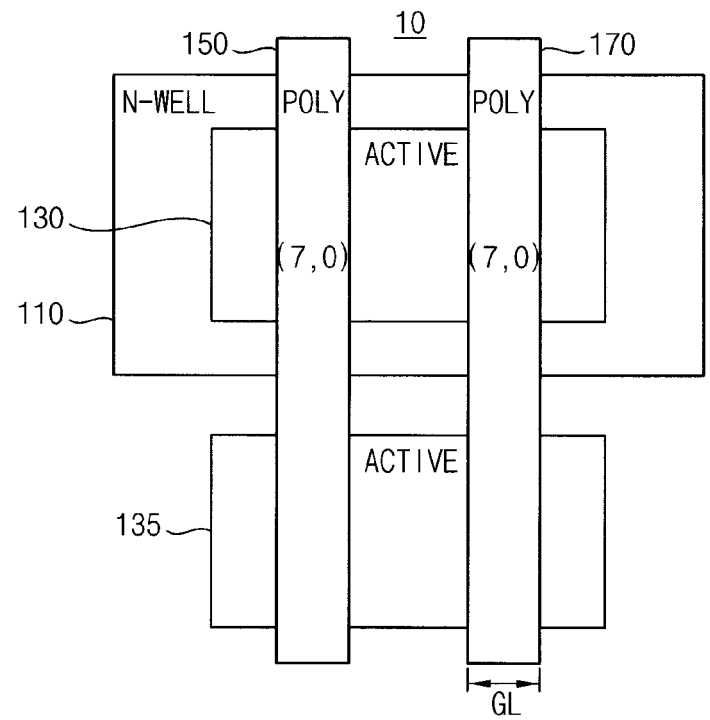
FIGS. 5, 6, 7, 8, 9, 10, 11 and 12 are diagrams for describing the method of FIG. 4.

Referring to FIG. 5, a semiconductor element 10 may be formed in the layout of the semiconductor device, and may include at least one of various transistors. The semiconductor element 10 may include a N-well region 110, active regions 130 and 135, and polysilicon regions 150 and 170 forming gate electrodes of the transistors. The N-well region 110 may correspond to a N-well polygon pattern, the active regions 130 and 135 may correspond to active polygon patterns, and the polysilicon regions 150 and 170 may correspond to polysilicon polygon patterns. The polysilicon polygon patterns may have predetermined information (7, 0) that represents a layer number and data type. For example, each polysilicon polygon pattern may have the layer number of "7" and the data type of "0". The layer number of "7" may represent that each polysilicon polygon pattern is included in a seventh layer. The data type of "0" may represent that each polysilicon polygon pattern is formed without biasing.

Hereinafter, the method of designing the semiconductor device according to an example embodiment will be explained in detail with reference to example configurations of modifying the gate length GL of the selected transistor that corresponds to the polysilicon region 170. The polysilicon polygon pattern corresponding to the polysilicon region 170 may be the target polygon pattern.

Figure 6:
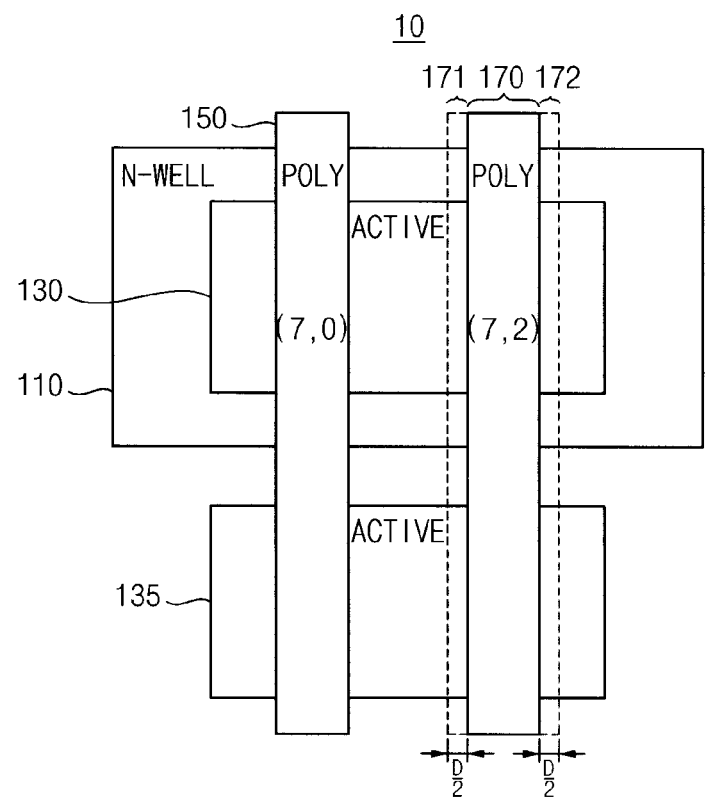

Referring to FIG. 6, when the gate length of the selected transistor corresponding to the polysilicon region 170 needs to be increased by a dimension D in the design process, the data type of the target polygon pattern corresponding to the polysilicon region 170 may be changed. For example, the information of the target polygon pattern may be changed from (7, 0) to (7, 2). In other words, the data type of the target polygon pattern may be changed from the first data type (e.g., "0") to the second data type (e.g., "2"). The data type of "2" may represent that the target polygon pattern is formed with biasing of about D. The layer number of the target polygon pattern may be maintained at "7".

In an example embodiment, the data type may correspond to an increased gate length. For example, when the gate length GL corresponding to the polysilicon region 170 needs to be increased by 2 nm, the data type of the target polygon pattern may be changed from "0" to "2". In another non-limiting embodiment, when the gate length GL corresponding to the polysilicon region 170 needs to be increased by 3 nm, the data type of the target polygon pattern may be changed from "0" to "3".

When the data type of the target polygon pattern is changed, the target polygon pattern may include information with respect to additional polygon patterns corresponding to regions 171 and 172 (e.g., illustrated as dotted lines in FIG. 6). The DRC process may be performed based on the first data type (e.g., "0"). Since the data type of the target polygon pattern has merely been changed but the shape of the target polygon pattern has not yet been modified, the additional polygon patterns corresponding to the regions 171 and 172 may be ignored in the DRC process to prevent a design rule violation. In other words, the DRC process may be performed with respect to all polygon patterns using the same design rule, regardless of the data type. Thus, additional design rule violations due to such biasing (e.g., changing the data type) may not occur.

Although FIG. 6 illustrates that the target polygon pattern is modified based on the additional polygon patterns corresponding to the regions 171 and 172 that have dimensions or lengths of D/2 and are formed on both sides of the target polygon pattern, the target polygon pattern may be modified based on a single additional polygon pattern corresponding to a region that has a dimension or length of D and is formed on one side of the target polygon pattern, according to some example embodiments.

Figure 7:
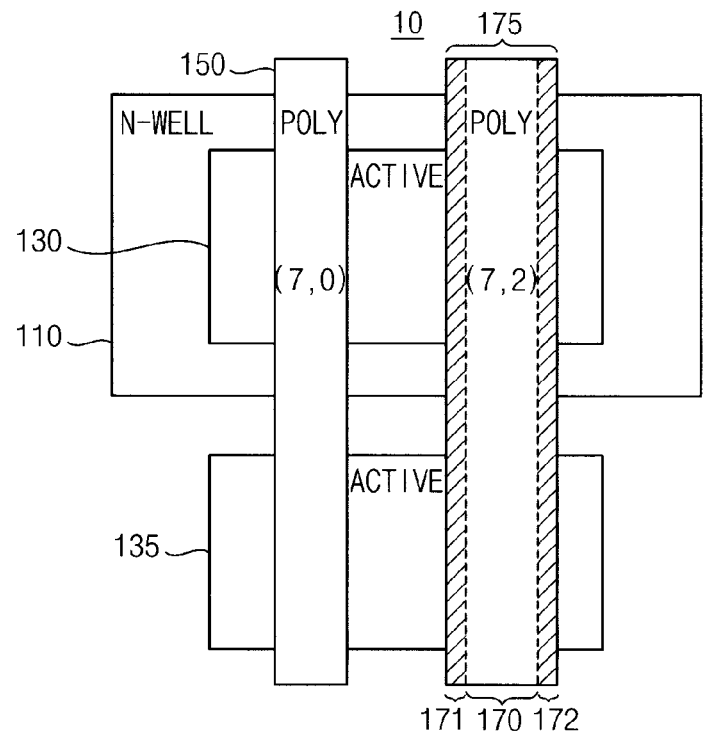
Figure 8:
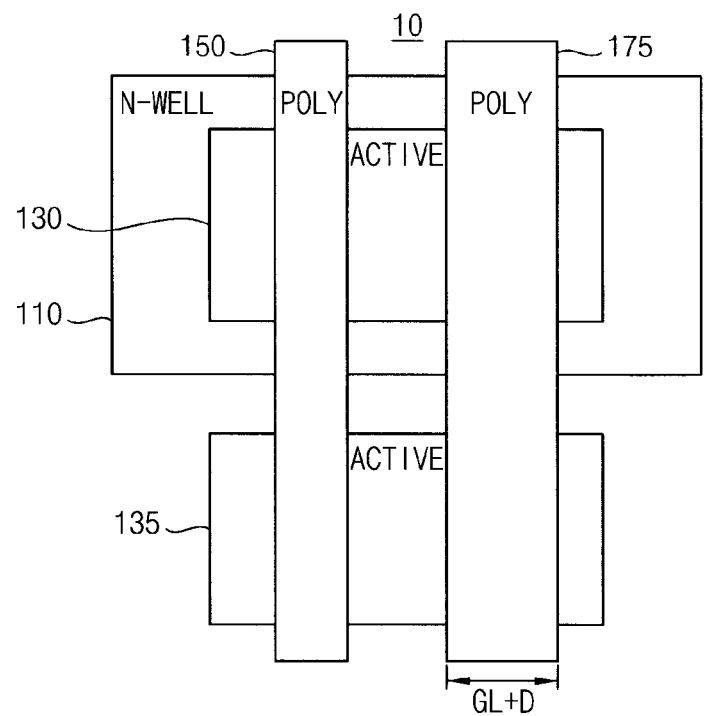

Referring to FIG. 7, the OPC process may be performed based on the second data type (e.g., "2"). In other words, in the OPC process, the additional polygon patterns corresponding to the regions 171 and 172 may be used to compensate for the defects caused by the OPE. Referring to FIG. 8, the polysilicon polygon pattern corresponding to the polysilicon region 170 may be changed into the modified polysilicon polygon pattern corresponding to a modified polysilicon region 175 having a dimension or length of about (GL+D), and the design process for the layout of the semiconductor device may be finished. A photomask for the polysilicon regions 150 and 175 may be manufactured based on the final layout of the semiconductor device illustrated in FIG. 8.

FIGS. 9, 10, 11 and 12 are additional diagrams for describing the method of FIG. 4. In FIGS. 9, 10, 11 and 12, a width of the selected transistor may be modified based on the changed data type of the target polygon pattern.

Figure 9:
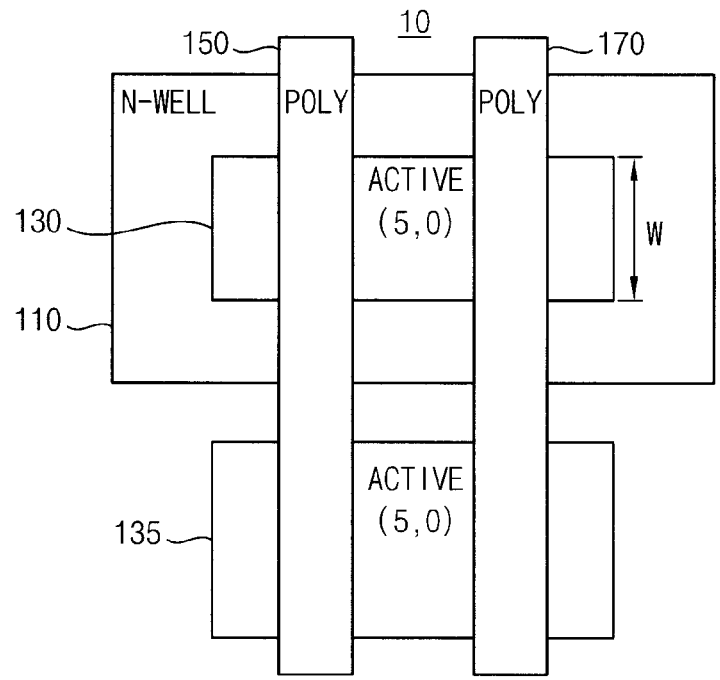

Referring to FIG. 9, a semiconductor element 10 may be formed in the layout of the semiconductor device, and may include at least one of various transistors. The semiconductor element 10 may include a N-well region 110, active regions 130 and 135, and polysilicon regions 150 and 170 forming gate electrodes of the transistors. The N-well region 110 may correspond to a N-well polygon pattern, the active regions 130 and 135 may correspond to active polygon patterns, and the polysilicon regions 150 and 170 may correspond to polysilicon polygon patterns. The active polygon patterns may have predetermined information (5, 0) that represents a layer number and data type. For example, each active polygon pattern may have the layer number of "5" and the data type of "0". The layer number of "5" may represent that each active polygon pattern is included in a fifth layer. The data type of "0" may represent that each active polygon pattern is formed without biasing.

Hereinafter, the method of designing the semiconductor device according to an example embodiment will be explained in detail with reference to example configurations of modifying the width W of the selected transistor that corresponds to the active region 130. The active polygon pattern corresponding to the active region 130 may be the target polygon pattern.

Figure 10:
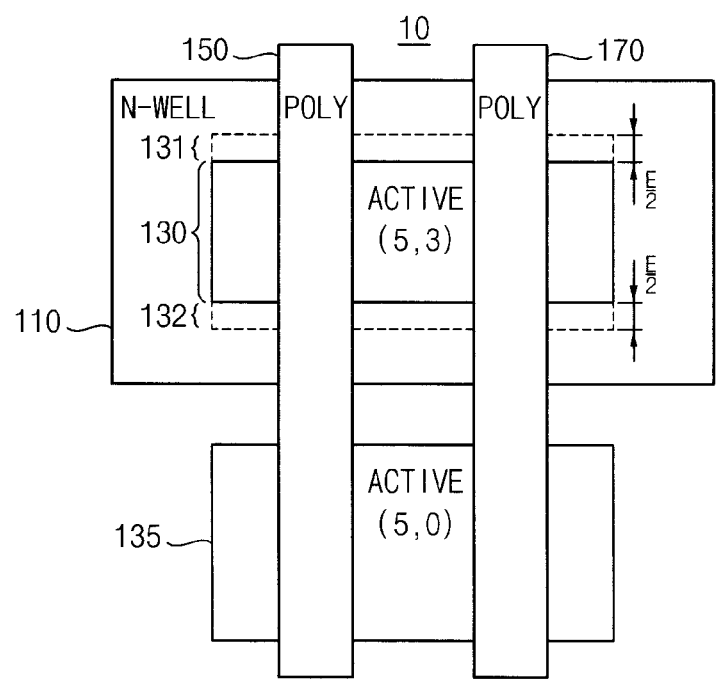

Referring to FIG. 10, when the width W of the selected transistor corresponding to the active region 130 needs to be increased by an enlargement E in the design process, the data type of the target polygon pattern corresponding to the active region 130 may be changed. For example, information of the target polygon pattern may be changed from (5, 0) to (5, 3). In other words, the data type of the target polygon pattern may be changed from the first data type (e.g., "0") to the second data type (e.g., "3"). The data type of "3" may represent that the target polygon pattern is formed with biasing of about E (e.g., 3 nm). The layer number of the target polygon pattern may be maintained at "5".

When the data type of the target polygon pattern is changed, the target polygon pattern may include information with respect to additional polygon patterns corresponding to regions 131 and 132 (e.g., illustrated as dotted lines in FIG. 10). The DRC process may be performed based on the first data type (e.g., "0"). Since the data type of the target polygon pattern has merely been changed but the shape of the target polygon pattern has not yet been modified, the additional polygon patterns corresponding to the regions 131 and 132 may be ignored in the DRC process to prevent a design rule violation. In other words, the DRC process may be performed with respect to all polygon patterns using the same design rule, regardless of the data type. Thus, additional design rule violations due to such biasing (e.g., changing the data type) may not occur.

Although FIG. 10 illustrates that the target polygon pattern is modified based on the additional polygon patterns corresponding to the regions 131 and 132 that have enlargements or lengths of E/2 and are formed on both sides of the target polygon pattern, the target polygon pattern may be modified based on a single additional polygon pattern corresponding to a region that has an enlargement or length of E and is formed on one side of the target polygon pattern, according to some example embodiments.

Figure 11:
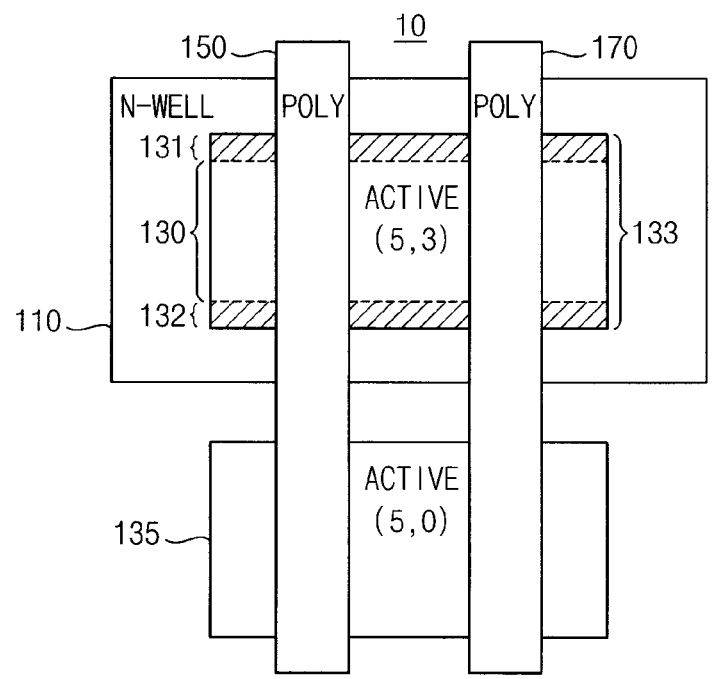
Figure 12:
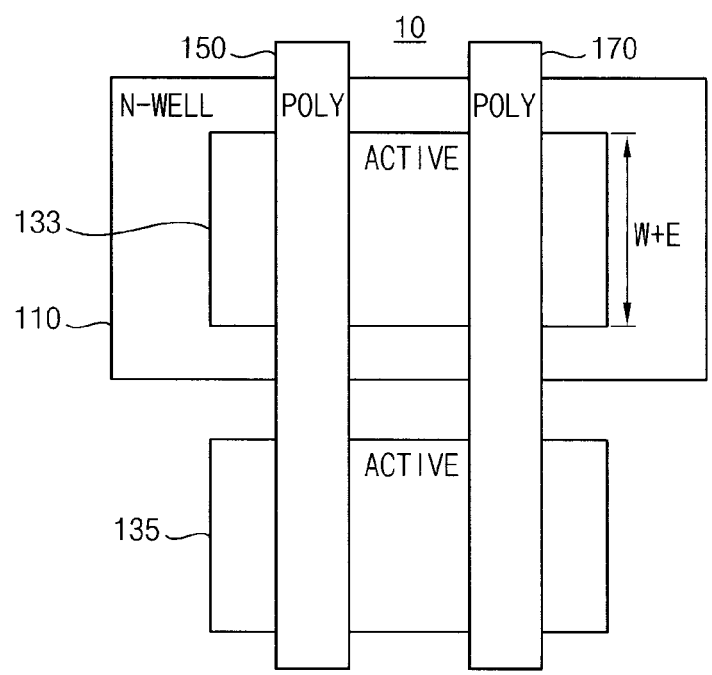

Referring to FIG. 11, the OPC process may be performed based on the second data type (e.g., "3"). In other words, in the OPC process, the additional polygon patterns corresponding to the regions 131 and 132 may be used to compensate for the defects caused by the OPE. Referring to FIG. 12, the active polygon pattern corresponding to the active region 130 may be changed into the modified active polygon pattern corresponding to a modified active region 133 having a width of about (W+E), and the design process for the layout of the semiconductor device may be finished. A photomask for the active regions 133 and 135 may be manufactured based on the final layout of the semiconductor device illustrated in FIG. 12.

Figure 13:
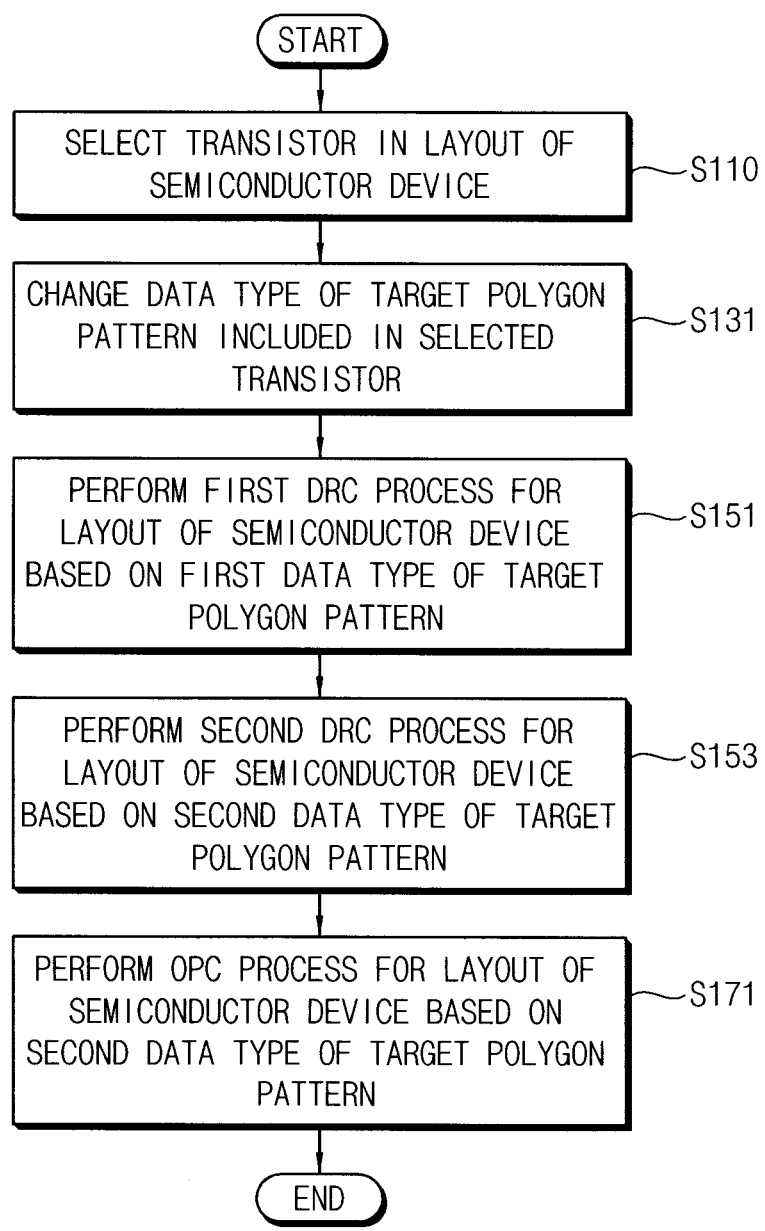
FIG. 13 is a flow chart illustrating another example of the method of FIG. 1.

FIG. 13 is a flow chart illustrating another example of the method of FIG. 1.

Referring to FIG. 13, in the method of designing the semiconductor device according to another example embodiment, the transistor in the layout of the semiconductor device may be selected (step S110), data type of the target polygon pattern included in the selected transistor may be changed (step S131), a first DRC process for the layout of the semiconductor device may be performed based on a first data type of the target polygon pattern (step S151), a second DRC process for the layout of the semiconductor device may be performed based on a second data type of the target polygon pattern (step S153), and the OPC process for the layout of the semiconductor device may be performed based on the second data type of the target polygon pattern (step S171). The target polygon pattern may correspond to one of the components in the selected transistor and may need to be modified. The first data type may correspond to a pre-changed data type before the data type of the target polygon pattern is changed. The second data type may correspond to the changed data type after the data type of the target polygon pattern is changed.

The steps S110, S131, S151 and S171 may be substantially the same as the steps S110, S131, S151 and S171 in FIG. 4, respectively. In comparison with the method of FIG. 4, the second DRC process for the layout of the semiconductor device may be further performed based on the second data type of the target polygon pattern in the method of FIG. 13.

In the step S151, the first DRC process may be performed with respect to all polygon patterns using the same design rule. In the step S153, the second DRC process may be performed with respect to the target polygon pattern using a design rule that differs from the design rule of the first DRC process. In other words, the first DRC process may be a process for checking whether additional design rule violations due to such biasing (e.g., changing the data type) have occurred, and the second DRC process may be a process for checking whether information (e.g., data type) of the target polygon pattern has been properly changed. Thus, any modification errors for the data type of the target polygon pattern may be corrected in the second DRC process.

Figure 14:
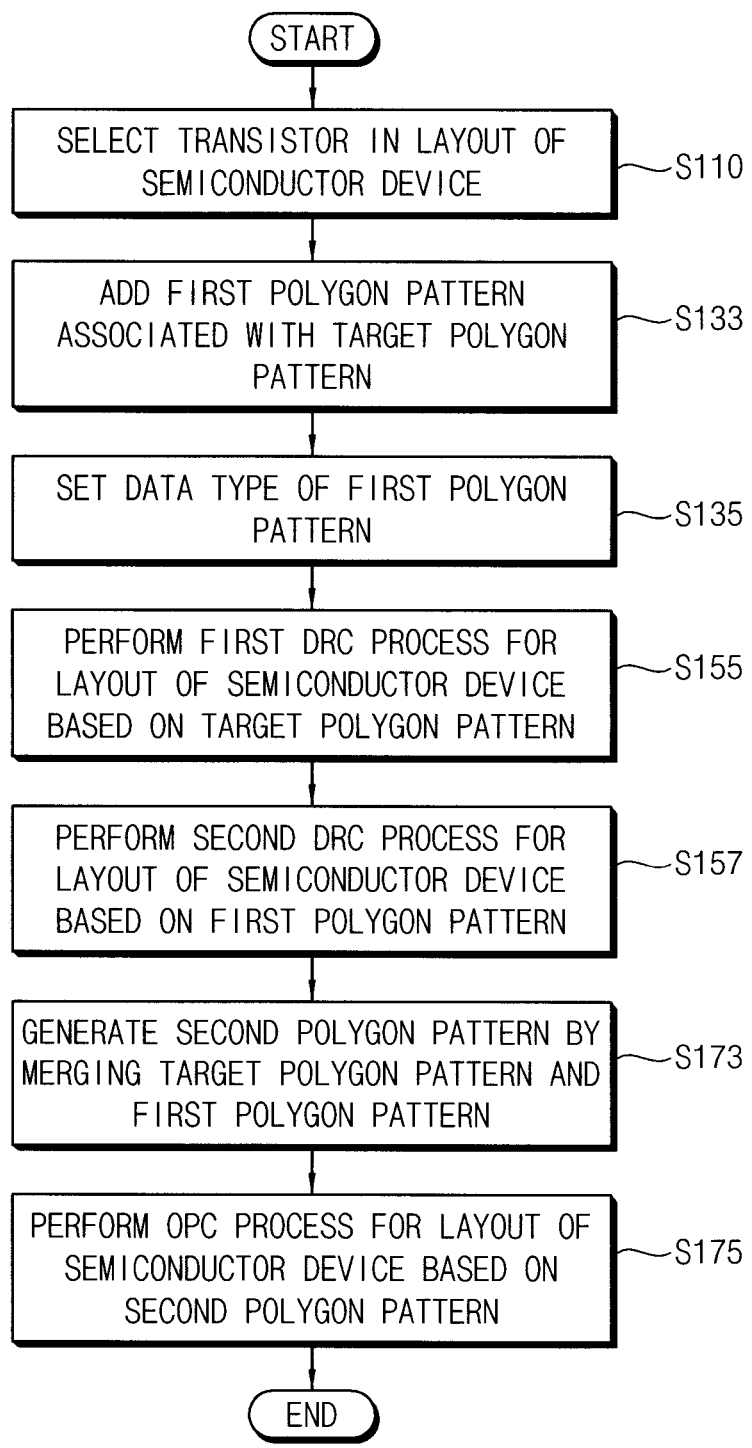
FIG. 14 is a flow chart illustrating another example of the method of FIG. 1.

FIG. 14 is a flow chart illustrating another example of the method of FIG. 1.

Referring to FIG. 14, in the method of designing the semiconductor device according to another example embodiment, the transistor in the layout of the semiconductor device may be selected (step S110), a first polygon pattern associated with a target polygon pattern may be added (step S133), a data type of the first polygon pattern may be set (step S135), a first DRC process for the layout of the semiconductor device may be performed based on the target polygon pattern (step S155), a second DRC process for the layout of the semiconductor device may be performed based on the first polygon pattern (step S157), a second polygon pattern may be generated by merging the target polygon pattern and the first polygon pattern (step S173), and the OPC process for the layout of the semiconductor device may be performed based on the second polygon pattern (step S175). The target polygon pattern may correspond to one of the components in the selected transistor and may need to be modified.

The step S110 may be substantially the same as the step S110 in FIG. 1. The steps S133 and S135 may correspond to the step S130 in FIG. 1. In this embodiment, the biasing data may be set by adding the first polygon pattern associated with the target polygon pattern. The layout of the semiconductor device may be modified based on the added first polygon pattern in the OPC process.

The step S155 may correspond to the step S150 in FIG. 1. In other words, the first DRC process may be performed after ignoring the added first polygon pattern. In the first DRC process, since a shape of the target polygon pattern is not directly modified, the design rule violation (e.g., the light design rule violation) may be prevented by ignoring the added first polygon pattern. Thus, the layout of the semiconductor device may be effectively modified without the design rule violation.

In an example embodiment, in the method of FIG. 14, the second DRC process may be further performed based on the first polygon pattern. The second DRC process may be a process for checking the layer data of the first polygon pattern and the data type of the first polygon pattern. In other words, the second DRC process may be performed with respect to the first polygon pattern using a design rule that differs from a design rule of the first DRC process, and may be performed by checking whether the first polygon pattern is properly added and whether the data type of the first polygon pattern is properly set.

The steps S173 and S175 may correspond to the step S170 in FIG. 1. In other words, the OPC process may be performed based on both the target polygon pattern and the added first polygon pattern.

FIGS. 15, 16, 17 and 18 are diagrams for describing the method of FIG. 14. In FIGS. 15, 16, 17 and 18, a gate length of the selected transistor may be modified based on the added first polygon pattern.

Figure 15:
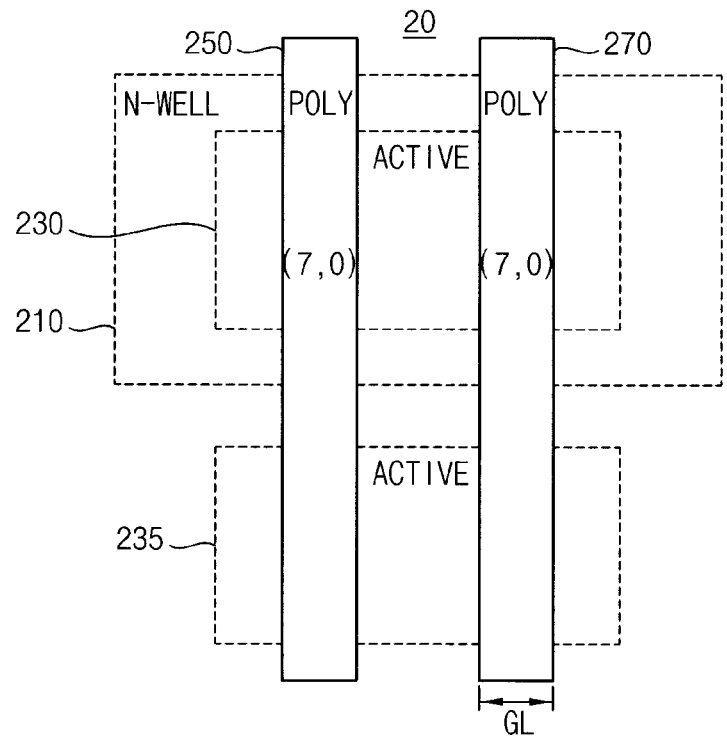
FIGS. 15, 16, 17 and 18 are diagrams for describing the method of FIG. 14.

Referring to FIG. 15, a semiconductor element 20 may be formed in the layout of the semiconductor device, and may include at least one of various transistors. The semiconductor element 20 may include a N-well region 210, active regions 230 and 235, and polysilicon regions 250 and 270 forming gate electrodes of the transistors. The N-well region 210 may correspond to a N-well polygon pattern, the active regions 230 and 235 may correspond to active polygon patterns, and the polysilicon regions 250 and 270 may correspond to polysilicon polygon patterns. The polysilicon polygon patterns may have predetermined information (7, 0) that represents a layer number and data type. For example, each polysilicon polygon pattern may have the layer number of "7" and the data type of "0".

Hereinafter, the method of designing the semiconductor device according to another example embodiment will be explained in detail with reference to example configurations of modifying the gate length GL of the selected transistor that corresponds to the polysilicon region 270. The polysilicon polygon pattern corresponding to the polysilicon region 270 may be the target polygon pattern.

Figure 16:
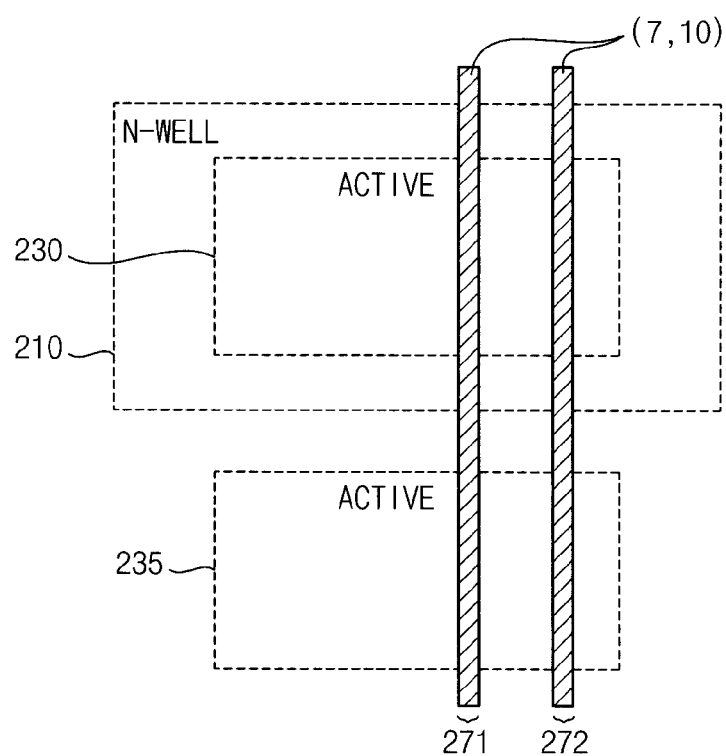

Referring to FIG. 16, when the gate length GL of the selected transistor corresponding to the polysilicon region 270 needs to be increased by D in the design process, first polygon patterns may be added. The first polygon patterns may be associated with the target polygon pattern corresponding to the polysilicon region 270 and may correspond to regions 271 and 272. The first polygon patterns may be set to have information (7, 10) that represents a layer number and data type. For example, the layer number of each first polygon pattern may be set as "7", which is substantially the same as the layer number of the target polygon pattern. The data type of each first polygon pattern may be set as "10". The data type of "10" may represent that each first polygon pattern is added for biasing and is ignored in the first DRC process.

Although FIG. 16 illustrates the first polygon patterns corresponding to the regions 271 and 272 that have dimensions or lengths of D/2 and are formed on both sides of the target polygon pattern, the first polygon pattern may correspond to a single region that has a dimension or length of D and is formed on one side of the target polygon pattern, according to some example embodiments.

After the first polygon patterns are added, the first DRC process may be performed based on the target polygon pattern. Since the first polygon patterns have merely been added but the shape of the target polygon pattern has not yet been modified, the first polygon patterns may be ignored in the first DRC process to prevent a design rule violation. In other words, the first DRC process may be performed with respect to all polygon patterns using the same design rule. Thus, additional design rule violations due to such biasing (e.g., adding the first polygon patterns) may not occur.

After the first DRC process is performed, the second DRC process may be performed based on the first polygon patterns. As described above, the second DRC process may be performed with respect to the first polygon patterns using a design rule that differs from the design rule of the first DRC process, and the second DRC process may be performed by checking whether the first polygon pattern is properly added and whether the data type of the first polygon pattern is properly set. Thus, any modification errors for the first polygon patterns may be corrected in the second DRC process.

Figure 17:
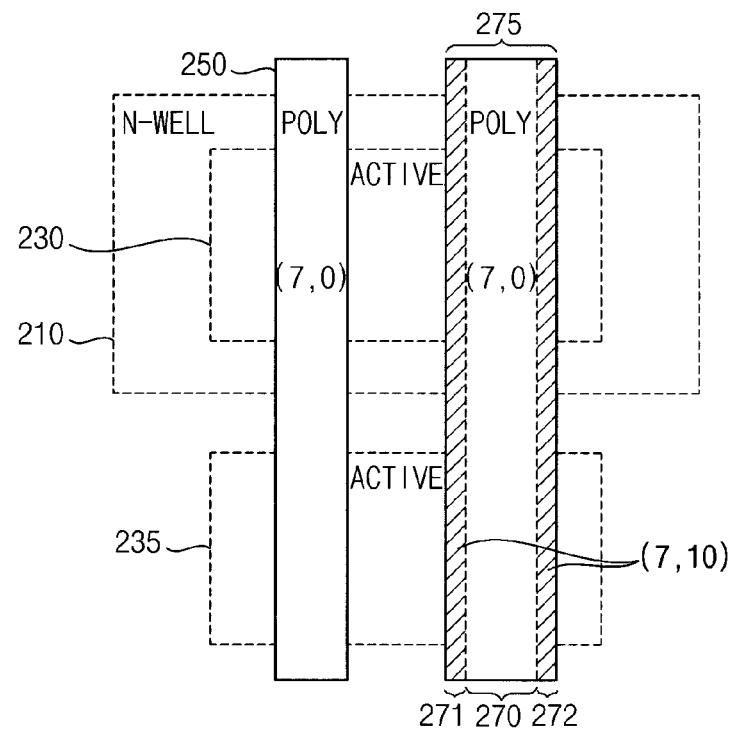
Figure 18:
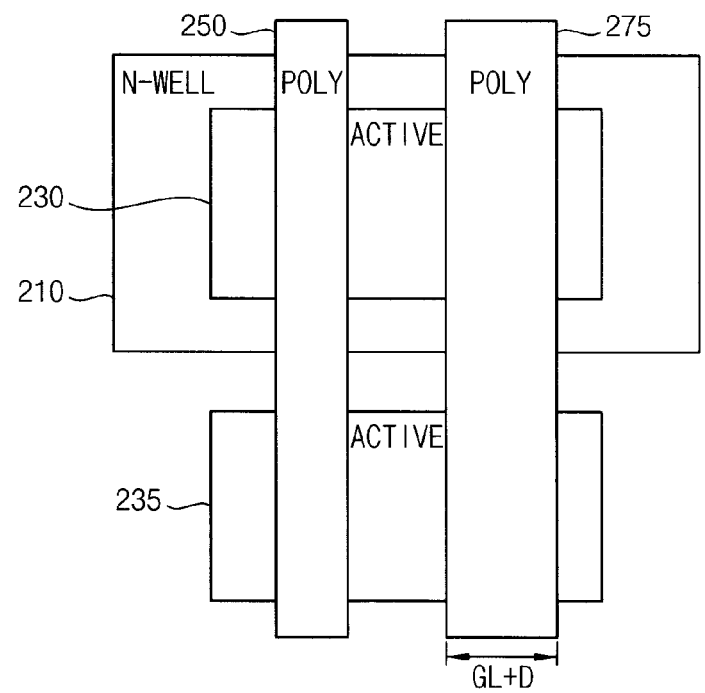

Referring to FIG. 17, the second polygon pattern corresponding to a modified polysilicon region 275 may be generated by merging the target polygon pattern corresponding to the polysilicon region 270 and the first polygon patterns corresponding to the regions 271 and 272. The OPC process may be performed based on the second polygon pattern. In other words, in the OPC process, the first polygon patterns may be used to compensate for the defects caused by the OPE. Referring to FIG. 18, the polysilicon polygon pattern corresponding to the polysilicon region 270 may be changed into the modified polysilicon polygon pattern corresponding to the modified polysilicon region 275 having a dimension or length of about (GL+D), and the design process for the layout of the semiconductor device may be finished. A photomask for the polysilicon regions 250 and 275 may be manufactured based on the final layout of the semiconductor device illustrated in FIG. 18.

Similarly, a width of the selected transistor may be modified based on the added first polygon pattern. For example, assuming that the active polygon pattern corresponding to the active region 230 is the target polygon pattern. The first polygon patterns that are associated with the target polygon pattern corresponding to the active region 230 may be added. The first DRC process may be performed based on the target polygon pattern, and the second DRC process may be performed based on the first polygon patterns. The second polygon pattern may be generated by merging the target polygon pattern corresponding to the active region 230 and the first polygon patterns. The OPC process may be performed based on the second polygon pattern. Thus, additional design rule violations due to such biasing (e.g., adding the first polygon patterns) may not occur.

Although the method of designing the semiconductor device according to some example embodiments is mainly described to modify a gate length and/or a width of the selected transistor, the method of designing the semiconductor device may be used for modifying at least one of various polygon patterns included in the layout of the semiconductor device. Thus, the designer may effectively modify the layout of the semiconductor device without a design rule violation (e.g., a light design rule violation) and may more rapidly and accurately design the layout of the semiconductor device.

The above described non-limiting embodiments may be used in development of an arbitrary integrated circuit and/or an arbitrary electronic system, which may include a semiconductor device. For example, the method of designing the semiconductor device according to some example embodiments may be used in a semiconductor memory device, an application processor, a microprocessor, a CPU, an application-specific integrated circuit (ASIC), a mobile SoC, a multimedia SoC, a smartcard, etc.

The foregoing is merely illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is merely illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of designing a semiconductor device, the method comprising:
    selecting a transistor included in a layout of the semiconductor device;
    setting biasing data, related to a physical characteristic of the transistor, for changing the physical characteristic of the transistor, the setting biasing data including changing a data type of a target polygon pattern included in the transistor, the target polygon pattern corresponding to a component in the transistor;
    performing, in a processor, a design rule check (DRC) process for the layout of the semiconductor device while ignoring the biasing data; and
    performing, in the processor, an optical proximity correction (OPC) process for the layout of the semiconductor device based on the biasing data.

2. The method of claim 1, wherein the performing the DRC process includes:
    performing the DRC process for the layout of the semiconductor device based on a first data type of the target polygon pattern, the first data type corresponding to a pre-changed data type before the data type of the target polygon pattern is changed.

3. The method of claim 2, wherein the performing the OPC process includes:
    performing the OPC process for the layout of the semiconductor device based on a second data type of the target polygon pattern, the second data type corresponding to a changed data type after the data type of the target polygon pattern is changed.

4. The method of claim 3, further comprising:
    performing a second DRC process for the layout of the semiconductor device based on the second data type of the target polygon pattern.

5. The method of claim 1, wherein the changing the data type of the target polygon pattern includes modifying a gate length of the transistor.

6. The method of claim 1, wherein the changing the data type of the target polygon pattern includes modifying a width of the transistor.

7. The method of claim 1, wherein the setting biasing data further includes establishing a value that is within at least one of design margins and manufacturing process margins for the semiconductor device.

8. The method of claim 1, wherein the physical characteristic of the transistor includes at least one of a width of the transistor and a gate length of the transistor.

9. A method of claim 1 designing a semiconductor device, the method comprising:
    selecting a transistor included in a layout of the semiconductor device;
    setting biasing data, related to a physical characteristic of the transistor, for changing the physical characteristic of the transistor, wherein the setting biasing data includes adding a first polygon pattern associated with a target polygon pattern, the target polygon pattern corresponding to a component in the transistor;
    performing, in a processor, a design rule check (DRC) process for the layout of the semiconductor device while ignoring the biasing data; and
    performing, in the processor, an optical proximity correction (OPC) process for the layout of the semiconductor device based on the biasing data.

10. The method of claim 9, wherein the setting biasing data further includes:
    setting a data type of the first polygon pattern.

11. The method of claim 9, wherein the performing the DRC process includes:
    performing a first DRC process for the layout of the semiconductor device based on the target polygon pattern.

12. The method of claim 11, further comprising:
    performing a second DRC process for the layout of the semiconductor device based on the first polygon pattern.

13. The method of claim 12, wherein the second DRC process is a process for checking a data type of the first polygon pattern and a layer data of the first polygon pattern.

14. The method of claim 9, wherein the performing the OPC process includes:
    generating a second polygon pattern by merging the target polygon pattern and the first polygon pattern; and
    performing the OPC process for the layout of the semiconductor device based on the second polygon pattern.

15. The method of claim 9, wherein the setting biasing data includes modifying at least one of a gate length of the transistor and a width of the transistor based on the first polygon pattern.

16. A method of modifying a layout of a semiconductor device, the method comprising:
    assigning biasing data, related to a physical characteristic of a transistor, associated with change to the physical characteristic of the transistor in the layout of the semiconductor device, the assigning biasing data including adjusting a first data type of the transistor to a second data type, the second data type corresponding to the change to the physical characteristic of the transistor;

performing, in a processor, a design rule check (DRC) process for the layout of the semiconductor device without the biasing data; and performing, in the processor, an optical proximity correction (OPC) process for the layout of the semiconductor device based on the biasing data.

17. The method of claim 16, wherein the performing the DRC process includes conducting the DRC process based on the first data type.

18. The method of claim 16, wherein the performing the OPC process includes conducting the OPC process based on the second data type.

19. The method of claim 18, further comprising:
conducting a second DRC process based on the second data type prior to conducting the OPC process.

20. The method of claim 16, wherein the physical characteristic of the transistor includes at least one of a width of the transistor and a gate length of the transistor.

* * * * *